United States Patent
Yasumori et al.

(10) Patent No.: US 8,605,388 B2
(45) Date of Patent: Dec. 10, 2013

(54) MAGNETIC RECORDING MEDIUM WITH GUARD LAYER BETWEEN AUXILIARY AND MAGNETIC RECORDING LAYERS AND MANUFACTURING METHOD OF THE MAGNETIC RECORDING MEDIUM

(75) Inventors: Junichi Yasumori, Tokyo (JP); Yoshiaki Sonobe, Tokyo (JP); Tadashi Tomonaga, Tokyo (JP)

(73) Assignee: WD Media (Singapore) Pte. Ltd., Singapore (SG)

( * ) Notice: Subject to any disclaimer, the term of this patent is extended or adjusted under 35 U.S.C. 154(b) by 436 days.

(21) Appl. No.: 12/745,206

(22) PCT Filed: Mar. 9, 2009

(86) PCT No.: PCT/JP2009/054394
§ 371 (c)(1),
(2), (4) Date: May 27, 2010

(87) PCT Pub. No.: WO2009/116412
PCT Pub. Date: Sep. 24, 2009

(65) Prior Publication Data
US 2010/0321826 A1 Dec. 23, 2010

(30) Foreign Application Priority Data

Mar. 17, 2008 (JP) ................................ 2008-067027
Mar. 28, 2008 (JP) ................................ 2008-088140

(51) Int. Cl.
*G11B 5/82* (2006.01)

(52) U.S. Cl.
USPC ........................................ 360/135; 428/828

(58) Field of Classification Search
USPC .................................. 360/135; 428/826–830
See application file for complete search history.

(56) References Cited

U.S. PATENT DOCUMENTS

| | | | |
|---|---|---|---|
| 6,468,670 | B1 | 10/2002 | Ikeda et al. |
| 7,833,639 | B2 | 11/2010 | Sonobe et al. |
| 8,367,228 | B2 | 2/2013 | Sonobe et al. |
| 2008/0062575 | A1 | 3/2008 | Shimizu |
| 2008/0090104 | A1 | 4/2008 | Sonobe et al. |
| 2010/0021768 | A1 | 1/2010 | Sonobe et al. |

FOREIGN PATENT DOCUMENTS

| | | |
|---|---|---|
| JP | 5-205257 A | 8/1993 |
| JP | 3034879 A | 2/2000 |
| JP | 2006-024346 A | 1/2006 |
| JP | 2007-226862 A | 9/2007 |
| JP | 2008-084432 A | 4/2008 |
| WO | 2008/099859 A1 | 8/2008 |

OTHER PUBLICATIONS

Non-Final Office Action dated Oct. 4, 2011 from Japan Application No. JP2008-067027, 11 pages.
Written Opinion dated Mar. 13, 2012 from Singapore Application No. SG1003746-3, 5 pages.

(Continued)

*Primary Examiner* — Joseph Feild
*Assistant Examiner* — Gustavo Polo (57) ABSTRACT

It is an object to manufacture magnetic recording media with the high recording density. Since nonmagnetic portions (8) with a predetermined pattern are formed in a recording auxiliary layer (4) formed on a magnetic recording layer (3), it is possible to actualize a magnetic recording medium where magnetic portions (7) and the magnetic recording layer (3) immediately below the portions (7) are recording units. The nonmagnetic portions (8) are formed by non-magnetization using ion implantation, and it is thereby possible to manufacture magnetic recording media with the high recording density.

4 Claims, 4 Drawing Sheets

(56) References Cited

OTHER PUBLICATIONS

Written Opinion dated Oct. 31, 2012 from Singapore Application No. SG1003746-3, 5 pages.
Written Opinion dated Mar. 28, 2010 of the International Searching Authority PCT Application No. PCT/JP2008/067027, 7 pages.
Written Opinion dated Jun. 25, 2011 of the International Searching Authority PCT Application No. PCT/JP2009/005434, 7 pages.
Search Report dated Mar. 13, 2012 from Singapore Application No. SG201003746-3, 4 pages.

MAGNETIC RECORDING MEDIUM WITH GUARD LAYER BETWEEN AUXILIARY AND MAGNETIC RECORDING LAYERS AND MANUFACTURING METHOD OF THE MAGNETIC RECORDING MEDIUM

TECHNICAL FIELD

The present invention relates to magnetic recording media installed in a hard disk drive (HDD), etc. and a manufacturing method of the media.

BACKGROUND ART

With increases in capacity of information processing in recent years, various information recording techniques have been developed. Particularly, the surface recording density of the HDD using the magnetic recording technique continues to increase at an annual rate of about 100%. Recently, the information recording capacity exceeding 160 GB per disk has been required for 2.5-inch perpendicular magnetic recording media used in the HDD, etc. and to respond to such a requirement, it is demanded to actualize the information recording density exceeding 250 GB per square inch.

To attain the high recording density in magnetic recording media used in the HDD, etc. perpendicular magnetic recording media by perpendicular magnetic recording system have been proposed in recent years. In the perpendicular magnetic recording system, adjustments are made such that the axis of easy magnetization of the magnetic recording layer is oriented in the perpendicular direction to the substrate surface. The perpendicular magnetic recording system enables the thermal fluctuation phenomenon to be suppressed as compared with the conventional in-plane recording system, and is suitable to introduce high recording densities.

As the magnetic recording media used in the perpendicular magnetic recording system, $CoCrPt$—$SiO_2$ perpendicular magnetic recording media have been proposed because such media indicate high heat stability and excellent recording properties (for example, Non-patent Document 1). The media are granular type magnetic recording media where in the magnetic recording layer is formed a granular structure that nonmagnetic particle boundary portions are formed between magnetic particles growing continuously in the shape of pillars, and it is intended to both make magnetic particles fine and enhance the coercive force Hc. It is known to use oxides for the nonmagnetic particle boundary (nonmagnetic portion between magnetic particles), and for example, it is proposed to use one of $SiO_2$, $Cr_2O_3$, $TiO$, $TiO_2$, and $Ta_2O_5$ (for example, Patent Document 1). However, there is an upper limit in oxides capable of being contained in the particle boundary, and there are also limitations in improvements in fine particles and isolation.

Meanwhile, in order to further enhance the in-plane recording density, proposed also is a method of forming nonmagnetic areas by ion implantation after forming a magnetic layer (for example, Patent Document 2).

Patent Document 1: Japanese Unexamined Patent Publication No. 2006-024346
Patent Document 2: Japanese Unexamined Patent Publication No. 2007-226862
Non-patent Document 1: T. Oikawa et al., IEEE Trans. Magn, vol. 38, 1976-1978 (2002)

DISCLOSURE OF INVENTION

However, as described above, when nonmagnetic portions are formed in the magnetic recording layer made of a magnetic material by ion implantation, applied ions are dispersed in the magnetic recording layer, and there is a problem that it is difficult to non-magnetize only desired portions. Generally, the ions are distributed in a width with almost the same order as that of the implantation depth. In Patent Document 2,ions implanted with a depth of 20 nm are dispersed with a radius of the order of several tens of nanometers. With consideration given to the thickness of the magnetic layer being about 20 nm generally, it is difficult to form non-magnetized portions, for example, with a width of several tens of nanometers in the magnetic layer.

Further, in recent years, media have been proposed where an exchange coupling layer is provided on the magnetic layer to subject magnetic particles in the magnetic layer to exchange coupling. In this case, the distance is further increased from the uppermost layer portion to the magnetic layer of the media, and there is a problem that the width of ion beams is further broadened until the ions reach the magnetic layer. In this case, ions are applied to areas in which the magnetism is originally required to remain, and there is another problem that magnetic properties deteriorate and do not allow use as magnetic recording media. It is an object of the invention to provide discrete type magnetic recording media with a high recording density using a method of forming nonmagnetic portions by ion implantation.

To attain the above-mentioned object, the inventors of the invention thought of forming a recording auxiliary layer that is a magnetic film thinner than a magnetic layer on a magnetic recording layer formed of the magnetic layer, forming non-magnetic portions by implanting ions into portions corresponding to between track regions of the recording auxiliary layer, and thereby manufacturing a discrete type magnetic recording medium.

In other words, a magnetic recording medium according to the invention has a nonmagnetic substrate, a magnetic recording layer that is a perpendicular magnetic film in which the axis of easy magnetization is oriented substantially perpendicularly to the substrate surface of the nonmagnetic substrate, and a recording auxiliary layer having magnetism that is directly formed on the magnetic recording layer, and is characterized in that the recording auxiliary layer has magnetic portions having magnetism and nonmagnetic portions made nonmagnetic, the magnetic portions exist in areas corresponding to track regions, and that the nonmagnetic portions exist in areas corresponding to between track regions.

The magnetic recording medium according to the invention may further have a guard layer formed between the magnetic recording layer and the recording auxiliary layer. In this case, it is suitable that the guard layer is made of a material having Ru, Pt, Pd or $CoCrSiO_2$ as a main component.

In the magnetic recording medium according to the invention, it is suitable that a film thickness of the recording auxiliary layer is thinner than a film thickness of the magnetic recording layer. Further, the magnetic portions in the recording auxiliary layer are preferably perpendicular magnetic films where the axis of easy magnetization is oriented substantially perpendicularly to the nonmagnetic substrate.

In the magnetic recording medium according to the invention, it is suitable that a protective layer is formed on the recording auxiliary layer, and that the distance from the surface of the magnetic recording medium to a position nearest the surface in the recording auxiliary layer is 7 nm or less.

Further, a method of manufacturing a magnetic recording medium according to the invention is characterized by having the steps of forming a magnetic recording layer that is a perpendicular magnetic film in which the axis of easy magnetization is oriented substantially perpendicularly to the substrate surface of a nonmagnetic substrate on the nonmagnetic substrate, forming a recording auxiliary layer made of a magnetic material on the magnetic recording layer, and non-magnetizing portions corresponding to between track regions by implanting ions into the portions corresponding to between track regions of the recording auxiliary layer.

In the method of manufacturing a magnetic recording medium according to the invention, it is suitable that ions are implanted only into the recording auxiliary layer in the recording auxiliary layer and the magnetic recording layer.

The method of manufacturing a magnetic recording medium according to the invention may further have the step of forming a guard layer in between the magnetic recording layer and the recording auxiliary layer. In this case, it is suitable that the guard layer blocks ions implanted by ion implantation, and that ions are thereby implanted only into the recording auxiliary layer in the recording auxiliary layer and the magnetic recording layer. Further, it is suitable that the guard layer is made of a material having Ru, Pt, Pd or $CoCrSiO_2$ as a main component.

In the method of manufacturing a magnetic recording medium according to the invention, it is suitable that a film thickness of the recording auxiliary layer is thinner than a film thickness of the magnetic recording layer. Further, the recording auxiliary layer may be a perpendicular magnetic film where the axis of easy magnetization is oriented substantially perpendicularly to the nonmagnetic substrate.

In the method of manufacturing a magnetic recording medium according to the invention, due to the existence of the nonmagnetic portions in the recording auxiliary layer, the magnetic portions and the magnetic recording layer immediately below the magnetic portions can be made recording units, and it is possible to separate between adjacent recording units.

Further, in the method of manufacturing a magnetic recording medium according to the invention, instead of the magnetic recording layer, since the nonmagnetic portions are formed by implanting ions into the recording auxiliary layer with the film thickness thinner than the film thickness of the magnetic recording layer, dispersion of implanted ions is small in the film, nonmagnetic portions can be formed in a desired pattern, and it is possible to manufacture magnetic recording media with the high recording density.

Furthermore, when the guard layer is provided between the magnetic recording layer and recording auxiliary layer, ions are prevented from diffusing into the magnetic recording layer, and can be implanted into desired portions in the recording auxiliary layer as designed, and it is possible to manufacture magnetic recording media with the high recording density.

BEST MODE FOR CARRYING OUT THE INVENTION

Figure 1:
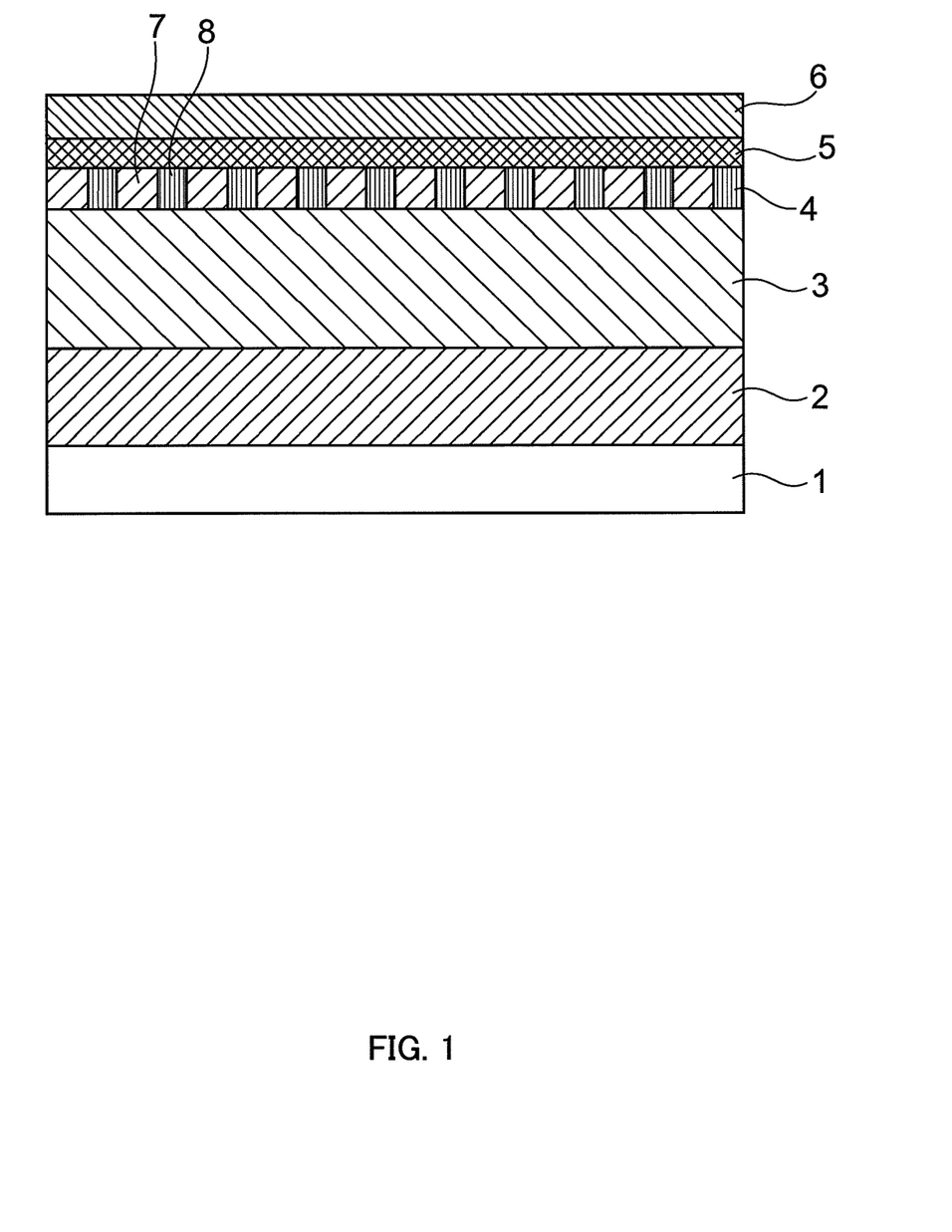
FIG. 1 is a diagram illustrating a cross-sectional structure of a magnetic recording medium according to the invention.

Embodiments to carry out the invention will be described below based on drawings. FIG. 1 is a diagram illustrating a cross-sectional structure of part of a magnetic recording medium according to the invention. As shown in FIG. 1, the magnetic recording medium according to the invention has a cross-sectional structure where on a nonmagnetic substrate 1 are stacked an intermediate layer 2 formed of an adhesive layer, etc. magnetic recording layer 3 formed of a magnetic material, recording auxiliary layer 4, medium protective layer 5 and lubricating layer 6, and the recording auxiliary layer 4 has magnetic portions 7 having magnetism, and nonmagnetic portions 8 made nonmagnetic.

As the nonmagnetic substrate 1, it is possible to use glass substrates such as soda glass and Al alloy substrates of Al—Mg alloys, etc.

As the intermediate layer 2, for example, an adhesive layer is formed to enhance adhesion between the nonmagnetic substrate and the upper layer. Further, in the case of the perpendicular magnetic recording system, on the adhesive layer are formed a soft magnetic layer to supplement the write magnetic field in recording while fixing the direction of magnetization in the magnetic recording layer more firmly to the perpendicular direction, and an orientation control layer to control the orientation and particle size in the magnetic recording layer.

As the adhesive layer, Ti alloys can be used. As the soft magnetic layer, it is possible to use materials made of soft magnetic materials such as Fe, Ni, Co, etc. As the orientation control layer, preferable are materials having an hcp structure, fcc structure, and amorphous structure, and preferable particularly are Ru alloys, Ni alloys, Co alloys and Pt alloys.

As the magnetic recording layer 3, it is possible to use perpendicular magnetic films in which the axis of easy magnetization is oriented substantially perpendicularly to the nonmagnetic substrate. The magnetic recording layer is preferably formed from an alloy with Co principally as a main component.

For example, it is possible to use CoCrPt alloys and materials where for example, an oxide such as $SiO_2$ forms a granular structure in CoCrPt.

The recording auxiliary layer 4 has the magnetic portions 7 having magnetism, and the nonmagnetic portions 8 made nonmagnetic, and the magnetic portions 7 may be a layer of, for example, CoCrPtTa, etc. magnetically continuous in the in-plane direction, or may be a layer of CoCrPtB alloys, etc. with high perpendicular magnetic anisotropy.

The medium protective layer 5 is a protective layer to protect the perpendicular magnetic recording layer from shock of a magnetic head. Generally, the layer 5 is formed of carbon, etc. and can be formed by a CVD method or sputtering method. Carbon deposited by the CVD method improves the film hardness as compared with the film deposited by the sputtering method, and is capable of protecting the perpendicular magnetic recording layer more effectively against shock from the magnetic head. As the lubricating layer 6, a lubricant such as perfluoro polyether, fluorine alcohol, fluorine carboxylic acid, etc. is used to form the film, for example, by a dip coating method or the like.

In the magnetic recording medium with such a configuration, due to the existence of the nonmagnetic portions 8 in the recording auxiliary layer 4, the magnetic portions 7 and the magnetic recording layer 3 immediately below the portions 7 can be made recording units, and it is possible to separate between adjacent recording units. For example, by setting a width of the magnetic portion 7 that is a width of the track region at 120 nm, and a width of the nonmagnetic portion that is a width between track regions at 60 nm, it is possible to actualize high-density discrete type magnetic recording media. Further, by non-magnetizing the recording auxiliary layer 4 in not only regions corresponding to between track regions, but also regions corresponding to between bits, it is also possible to configure bit patterned media.

In addition, in magnetic recording apparatuses, in recording or reproducing in the magnetic recording medium, a shorter distance is preferable between the magnetic head and the recording auxiliary layer 4, and it is suitable that the distance from the surface of the medium protective layer 5 that is the surface of the magnetic recording medium to a nearest position in the surface in the recording auxiliary layer 4 is 7 nm or less.

To manufacture the above-mentioned magnetic recording medium, for example, using a vacuumed deposition apparatus, in an atmosphere of Ar, layers of from the intermediate layer 2 up to the recording auxiliary layer 4 are formed on the nonmagnetic substrate 1 successively by the DC magnetron sputtering method, and the medium protective layer 5 can be formed by the CVD method.

Then, using an ion implantation device, from above the medium protective layer 5, ions of Ar or the like are implanted into only portions desired to make nonmagnetic in the recording auxiliary layer 4, the portions are thereby non-magnetized, and the nonmagnetic portions 8 are formed. For example, it is possible to implant ions using a mask that is designed and fabricated so as to apply ions to only portions desired to make nonmagnetic in the recording auxiliary layer 4.

As ions to implant, it is possible to use Ar, Si, In, B, P, C, F, etc. and the kind and combination thereof are not limited particularly. Any ion can be used which destroys magnetism when being implanted. The intensity of ion implantation is adjusted so that ions are mainly implanted into the recording auxiliary layer 4. As a material for the mask, it is possible to use any material such as quartz, soda lime glass and Si wafer which shields ions to enable a predetermined pattern to be formed.

After the nonmagnetic portions 8 and magnetic portions 7 are formed in the recording auxiliary layer 4 by ion implantation, as the lubricating layer 6, for example, perfluoro polyether is formed by the dip coating method.

[Another Embodiment]

Figure 2:
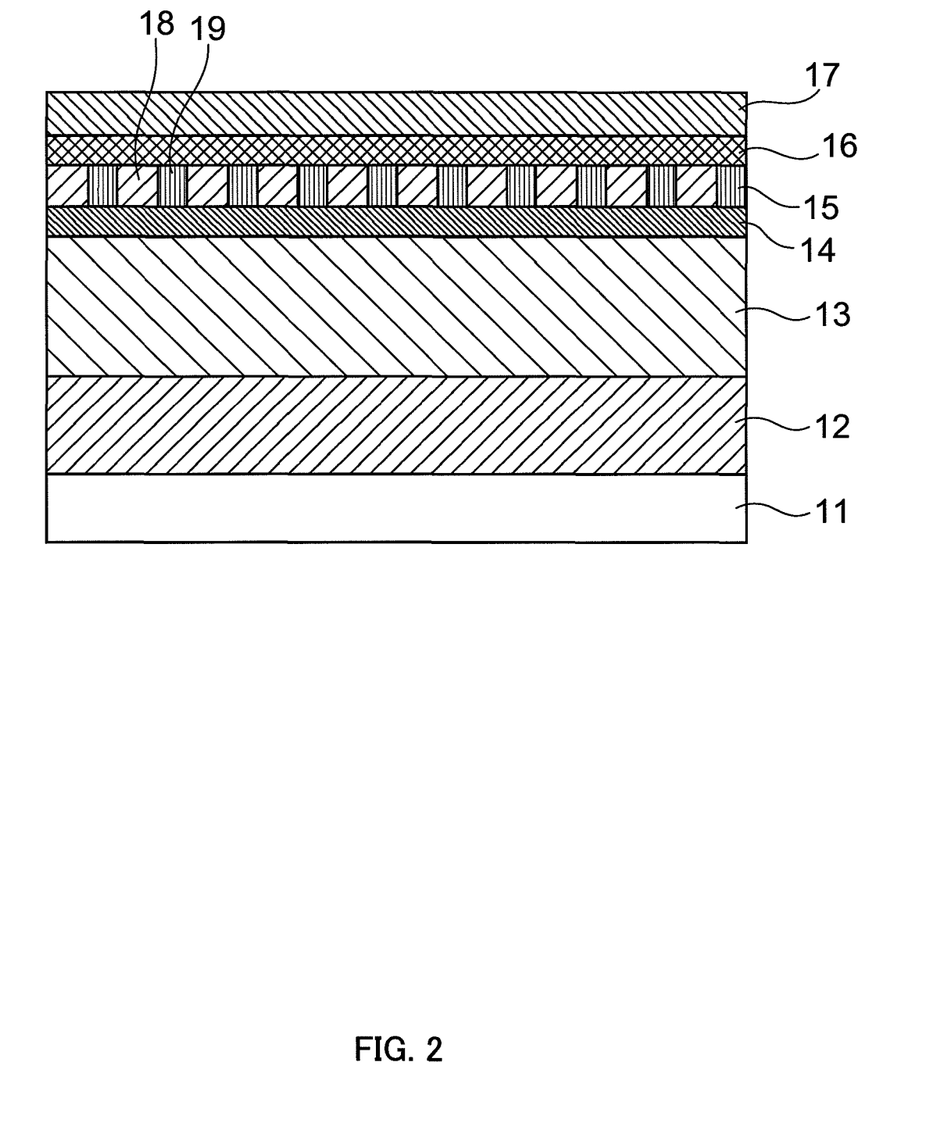
FIG. 2 is a diagram illustrating another cross-sectional structure of the magnetic recording medium according to the invention.

Another Embodiment to carry out the invention will be described below based on drawings. FIG. 2 is a diagram illustrating a cross-sectional structure of part of a magnetic recording medium according to the invention. As shown in FIG. 2, the magnetic recording medium according to the invention has a cross-sectional structure where on a nonmagnetic substrate 11 are stacked an intermediate layer 12 formed of an adhesive layer, etc. magnetic recording layer 13 formed of a magnetic material, guard layer 14, recording auxiliary layer 15, medium protective layer 16 and lubricating layer 17, and the recording auxiliary layer 15 has magnetic portions 18 having magnetism, and nonmagnetic portions 19 made nonmagnetic.

As the nonmagnetic substrate 11, it is possible to use glass substrates such as soda glass and Al alloy substrates of Al—Mg alloys, etc. As the intermediate layer 12, for example, an adhesive layer is formed to enhance adhesion between the nonmagnetic substrate and the upper layer. On the adhesive layer are formed a soft magnetic layer to supplement the write magnetic field in recording while fixing the direction of magnetization in the magnetic recording layer more firmly to the perpendicular direction, and an orientation control layer to control the orientation and particle size in the magnetic recording layer.

As the adhesive layer, Ti alloys can be used. As the soft magnetic layer, it is possible to use materials made of soft magnetic materials such as Fe, Ni, Co, etc. As the orientation control layer, preferable are materials having an hcp structure, fcc structure, and amorphous structure, and preferable particularly are Ru alloys, Ni alloys, Co alloys and Pt alloys.

As the magnetic recording layer 13, it is possible to use perpendicular magnetic films in which the axis of easy magnetization is oriented substantially perpendicularly to the nonmagnetic substrate. The magnetic recording layer is preferably formed from an alloy with Co principally as a main component. For example, it is possible to use CoCrPt alloys and materials where for example, an oxide such as $SiO_2$ forms a granular structure in CoCrPt.

The guard layer 14 is formed of a material that acts to block implanted ions not to diffuse into the magnetic recording layer 13 when the ions are implanted to form the nonmagnetic portions 19 in the recording auxiliary layer 15 described later. Further, the layer 14 preferably has a film thickness of the order of not forming a crystal structure so as not to interfere with exchange coupling of magnetic particles of the magnetic recording layer 13 via the magnetic portions 18 of the recording auxiliary layer 15, while conveying crystal growth in the magnetic recording layer 13 to the recording auxiliary layer 15 when the film is formed. For example, it is suitable that the material has Ru, Pt, Pd or $CoCrSiO_2$ as a main component. The film thickness is preferably in the range of 0.1 nm to 3 nm, and particularly preferably, 1 nm.

The recording auxiliary layer 15 has the magnetic portions 18 having magnetism, and the nonmagnetic portions 19 made nonmagnetic, and the magnetic portions 18 may be a layer of, for example, CoCrPtTa, etc. magnetically continuous in the in-plane direction, or may be a layer of CoCrPtB alloys, etc. with high perpendicular magnetic anisotropy.

The medium protective layer 16 is a protective layer to protect the perpendicular magnetic recording layer from shock of a magnetic head. Generally, the layer 16 is formed of carbon, etc. and can be formed by a CVD method or sputtering method. Carbon deposited by the CVD method improves the film hardness as compared with the film deposited by the sputtering method, and is capable of protecting the perpendicular magnetic recording layer more effectively against shock from the magnetic head. As the lubricating layer 17, a lubricant such as perfluoro polyether, fluorine alcohol, fluorine carboxylic acid, etc. is used to form the film, for example, by a dip coating method or the like.

In the magnetic recording medium with such a configuration, due to the existence of the nonmagnetic portions 19 in the recording auxiliary layer 15, the magnetic portions 18 and the magnetic recording layer 13 immediately below the portions 18 can be made recording units, and it is possible to separate between adjacent recording units. For example, by setting a width of the magnetic portion 18 that is a width of the track region at 120 nm, and a width of the nonmagnetic portion that is a width between track regions at 60 nm, it is possible to actualize high-density discrete type magnetic recording media. Further, by non-magnetizing the recording auxiliary layer 15 in not only regions corresponding to between track regions, but also regions corresponding to between bits, it is also possible to configure bit patterned media.

In addition, in magnetic recording apparatuses, in recording or reproducing in the magnetic recording medium, a shorter distance is preferable between the magnetic head and the recording auxiliary layer 15, and it is suitable that the distance from the surface of the medium protective layer 16 that is the surface of the magnetic recording medium to a position nearest the surface in the recording auxiliary layer 15 is 7 nm or less.

To manufacture the above-mentioned magnetic recording medium, for example, using a vacuumed deposition apparatus, in an atmosphere of Ar, layers of from the intermediate layer 12 up to the recording auxiliary layer 15 are formed on the nonmagnetic substrate 11 successively by a DC magnetron sputtering method, and the medium protective layer 16 can be formed by the CVD method.

Then, using an ion implantation device, from above the medium protective layer 16, ions of Ar or the like are implanted into only portions desired to make nonmagnetic in the recording auxiliary layer 15, the portions are thereby non-magnetized, and the nonmagnetic portions 19 are formed. For example, it is possible to implant ions using a mask that is designed and fabricated so as to apply ions to only portions desired to make nonmagnetic in the recording auxiliary layer 15. At this point, since the guard layer 14 is formed between the recording auxiliary layer 15 and magnetic recording layer 13, implanted ions are blocked by the guard layer 14 and do not diffuse into the magnetic recording layer 13, and it is possible to implant ions only into desired portions in the recording auxiliary layer 15.

As ions to implant, it is possible to use Ar, Si, In, B, P, C, F, etc. and the kind and combination thereof are not limited particularly. Any ion can be used which destroys magnetism when being implanted. The intensity of ion implantation is adjusted so that ions are mainly implanted into the recording auxiliary layer 15. As a material for the mask, it is possible to use any material such as quartz, soda lime glass and Si wafer which shields ions to enable a predetermined pattern to be formed.

After the nonmagnetic portions 19 and magnetic portions 18 are formed in the recording auxiliary layer 15 by ion implantation, as the lubricating layer 17, for example, perfluoro polyether is formed by the dip coating method.

EXAMPLE

Figure 3:
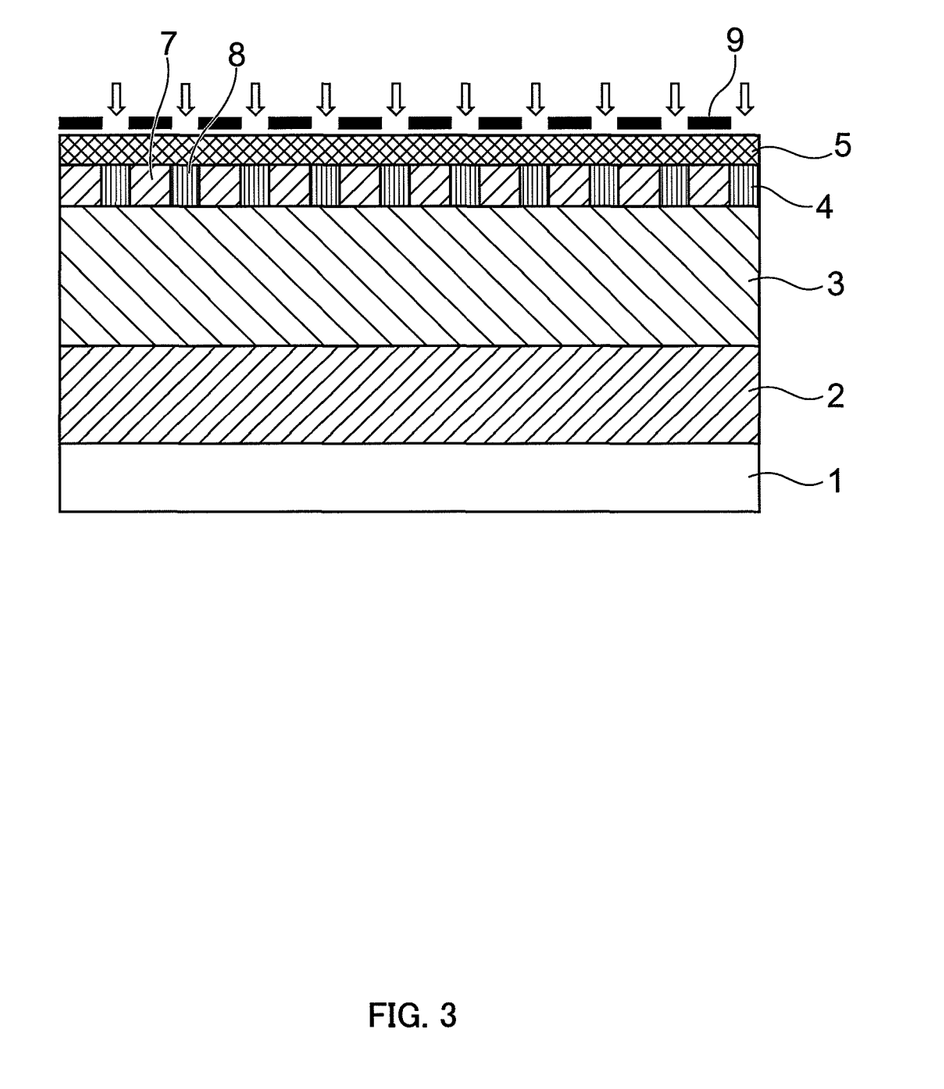
FIG. 3 is a diagram to explain a manufacturing process of the magnetic recording medium according to the invention.

An Example of the magnetic recording medium according to the invention will be described below in an example of using a perpendicular magnetic film in the magnetic recording layer. First, a method of manufacturing the magnetic recoding medium according to the invention is described with reference to FIG. 3. FIG. 3 is a diagram illustrating part of a cross section in the manufacturing process of the magnetic recording medium according to the invention.

First, as the nonmagnetic substrate 1, amorphous aluminosilicate glass was formed into a disk shape by direct press, and glass disks were prepared. The glass disks were subjected to grinding, polishing and chemical enhancement successively, and the smooth nonmagnetic substrates 1 each comprised of the chemically enhanced glass disk were obtained.

Next, using a vacuumed deposition apparatus, in an atmosphere of Ar, on each of the obtained nonmagnetic substrates 1 were formed successively layers of from the intermediate layer 2 up to the recording auxiliary layer 4 by the DC magnetron sputtering method. As the intermediate layer 2, a film of a CrTi alloy with a thickness of 10 nm was formed as the adhesive layer. Next, as the soft magnetic layer, a film of a FeCoTaZr alloy with a thickness of 50 nm was formed to obtain the so-called AFC—SUL structure with Ru therebetween. Then, a film of Ru with a thickness of 25 nm was formed as the orientation control layer. Subsequently, a film of CoCrPt—$SiO_2$ with a thickness of 13 nm was formed as the magnetic recording layer 3, and a film of CoCrPtB with a thickness of 8 nm was formed as the recording auxiliary layer 4.

Then, while keeping the vacuum, as the medium protective layer 5, a film of carbon with a thickness of 5 nm was formed by the CVD method.

Next, ion implantation was performed to form nonmagnetic portions in the recording auxiliary layer 4. In the ion implantation, Ar ions were implanted using a commercially available ion implantation device under the condition that the dose was $1 \times 10^{15}$ (ions/$cm^2$). At this point, as a mask 9, quartz glass was used with a pattern formed therein such that the width of nonmagnetic portions which were portions to non-magnetize was 60 nm, and that the width of magnetic portions 7 was 120 nm.

Finally, as the lubricating layer 6, a film of perfluoro polyether with a thickness of 1 nm was formed by the dip coating method.

In the magnetic recording media that were manufactured as described above, after removing the lubricating layer 6, magnetic properties were measured from above the medium protective layer 5 using a magnetic force microscope, and it was understood that differences in magnetic properties exist between the portions corresponding to the magnetic portions 7 and portions corresponding to the nonmagnetic portions 8, and that the magnetism in the magnetic portions 7 is higher than the magnetism in the nonmagnetic portions 8.

Further, after removing the medium protective layer 5, electron diffraction in a spot of a plane TEM (Transmission Electron Microscope) was observed on the surface of the recording auxiliary layer 4, and it was understood that the crystal structure is different between the magnetic portions 7 and nonmagnetic portions 8.

Next, after removing the recording auxiliary layer 4, electron diffraction in a spot of the plane TEM (Transmission Electron Microscope) was observed on the surface of the magnetic recording layer 3, and it was understood that the structure is uniform in the magnetic recording layer 3.

From the above-mentioned respects, it was confirmed that the magnetic recording medium according to the invention is a magnetic recording medium where the magnetic portion 7 and the magnetic recording layer 3 immediately below the portion 7 is a single recording unit.

As described above, in the magnetic recording medium according to the invention, by providing the recording auxiliary layer 4 with the nonmagnetic portions 8, the magnetic portions 7 and the magnetic recording layer 3 immediately below the portions 7 can be made recording units, and it is possible to separate between adjacent recording units.

Further, in the method of manufacturing a magnetic recording medium according to the invention, since the nonmagnetic portions 8 are formed by implanting ions into the recording auxiliary layer 4 with the film thickness thinner than that of the magnetic recording layer 3, dispersion of implanted ions is small in the film, nonmagnetic portions can be formed in a desired pattern, and it is possible to manufacture magnetic recording media with the high recording density. For example, it is possible to manufacture discrete type recording media by non-magnetizing the recording auxiliary layer 4 corresponding to between track regions. Further, it is possible to manufacture bit patterned recording media by non-magnetizing the recording auxiliary layer 4 corresponding to between track regions and between bits.

Moreover, the materials, sizes, processing procedures and the like in the above-mentioned Embodiments are of examples, and are capable of being carried into practice with various modifications thereof within the scope of exhibiting the effects of the invention. Further, the invention is capable of being carried into practice with modifications thereof as appropriate without departing from the scope of the invention.

Another Example

Figure 4:
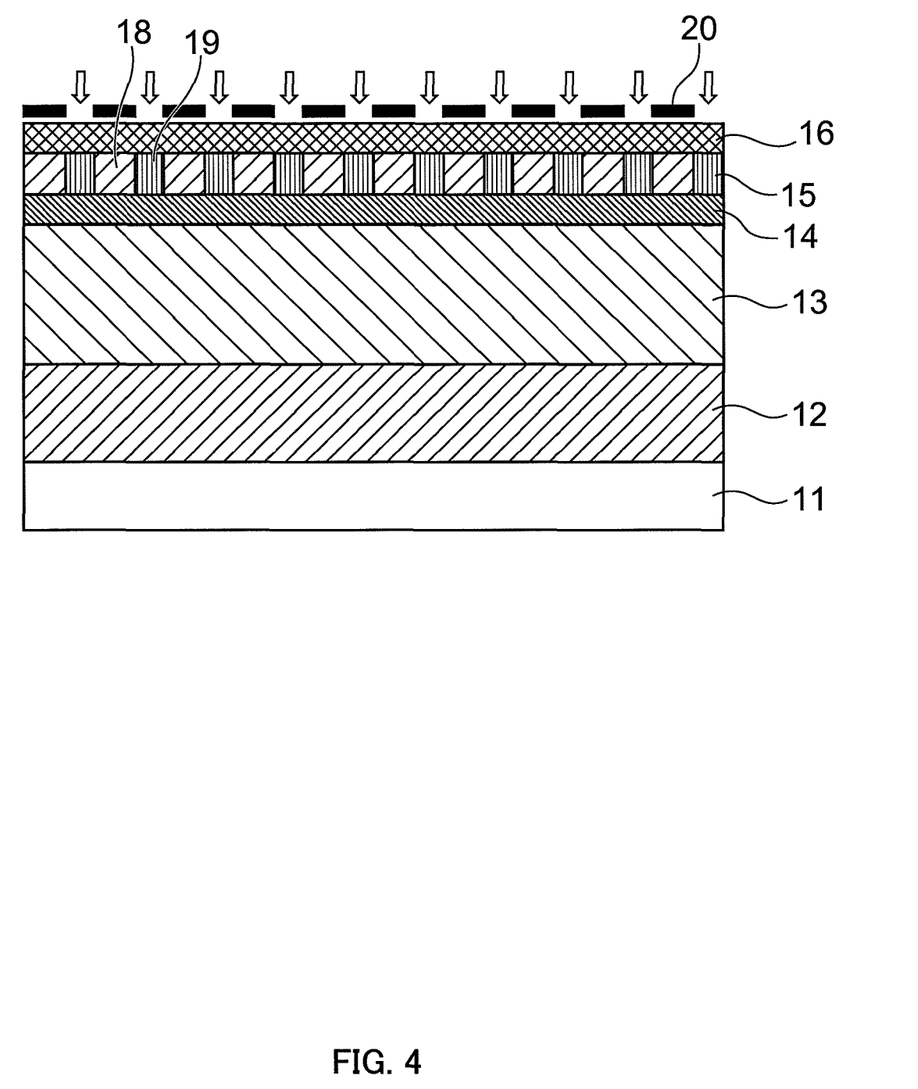
FIG. 4 is a diagram to explain another manufacturing process of the magnetic recording medium according to the invention.

Another example of the magnetic recording medium according to the invention will be described below in an example of using a perpendicular magnetic film in the magnetic recording layer. First, a method of manufacturing the magnetic recoding medium according to the invention is described with reference to FIG. 4. FIG. 4 is a diagram illustrating part of a cross section in the manufacturing process of the magnetic recording medium according to the invention.

First, as the nonmagnetic substrate 11, amorphous aluminosilicate glass was formed into a disk shape by direct press, and glass disks were prepared. The glass disks were subjected to grinding, polishing and chemical enhancement successively, and the smooth nonmagnetic substrates 11 each comprised of the chemically enhanced glass disk were obtained.

Next, using a vacuumed deposition apparatus, in an atmosphere of Ar, on each of the obtained nonmagnetic substrates 11 were formed successively the layers of from the intermediate layer 12 up to the recording auxiliary layer 15 by the DC magnetron sputtering method. As the intermediate layer 12, a film of a CrTi alloy with a thickness of 10 nm was formed as the adhesive layer. Next, as the soft magnetic layer, a film of a FeCoTaZr alloy with a thickness of 50 nm was formed to obtain the so-called AFC—SUL structure with Ru therebetween. Then, a film of Ru with a thickness of 25 nm was formed as the orientation control layer. Subsequently, a film of CoCrPt—$SiO_2$ with a thickness of 13 nm was formed as the magnetic recording layer 3, and a film of Ru with a thickness of 1 nm was formed on the layer 13 as the guard layer 14. A film of CoCrPtB with a thickness of 8 nm was formed on the guard layer 14 as the recording auxiliary layer 15. Then, while keeping the vacuum, as the medium protective layer 16, a film of carbon with a thickness of 5 nm was formed by the CVD method.

Next, ion implantation was performed to form nonmagnetic portions in the recording auxiliary layer 15. In the ion implantation, Ar ions were implanted using a commercially available ion implantation device under the condition that the dose was $1\times10^{15}$ (ions/$cm^2$). At this point, as a mask 20, quartz glass was used with a pattern formed therein such that the width of nonmagnetic portions 19 which were portions to non-magnetize was 60 nm, and that the width of magnetic portions 18 was 120 nm. Finally, as the lubricating layer 17, a film of perfluoro polyether with a thickness of 1 nm was formed by the dip coating method.

In the magnetic recording media that were manufactured as described above, after removing the lubricating layer 17, magnetic properties were measured from above the medium protective layer 16 using a magnetic force microscope, and it was understood that differences in magnetic properties exist between the portions corresponding to the magnetic portions 18 and portions corresponding to the nonmagnetic portions 19, and that the magnetism in the magnetic portions 18 is higher than the magnetism in the nonmagnetic portions 19.

Further, after removing the medium protective layer 16, electron diffraction in a spot of the plane TEM (Transmission Electron Microscope) was observed on the surface of the recording auxiliary layer 15, and it was understood that the crystal structure is different between the magnetic portions 18 and nonmagnetic portions 19.

Next, after removing the recording auxiliary layer 15 and guard layer 14, electron diffraction in a spot of the plane TEM (Transmission Electron Microscope) was observed on the surface of the magnetic recording layer 13, and it was understood that the structure is uniform in the magnetic recording layer 13.

From the above-mentioned respects, it was confirmed that the magnetic recording medium according to the invention is a magnetic recording medium where the magnetic portion 18 and the magnetic recording layer 13 immediately below the portion 18 is a single recording unit.

As described above, in the magnetic recording medium according to the invention, by providing the recording auxiliary layer 15 with the nonmagnetic portions 19, it was made possible to make the magnetic portions 18 and the magnetic recording layer 13 immediately below the portions 18 recording units, and to separate between adjacent recording units.

Further, in the method of manufacturing a magnetic recording medium according to the invention, since the nonmagnetic portions 19 are formed by implanting ions into the recording auxiliary layer 15 with the film thickness thinner than that of the magnetic recording layer 13, dispersion of implanted ions is small in the film, nonmagnetic portions can be formed in a desired pattern, and it is possible to manufacture magnetic recording media with the high recording density. For example, it is possible to manufacture discrete type recording media by non-magnetizing the recording auxiliary layer 15 corresponding to between track regions. Further, it is possible to manufacture bit patterned recording media by non-magnetizing the recording auxiliary layer 15 corresponding to between track regions and between bits.

Furthermore, since the guard layer 14 is formed between the recording auxiliary layer 15 and magnetic recording layer 13, in ion implantation in forming the nonmagnetic portions 19 in the recording auxiliary layer 15, implanted ions were blocked by the guard layer 14 and did not diffuse into the magnetic recording layer 13, and it was made possible to form the nonmagnetic portions 19 in desired portions in the recording auxiliary layer 15.

Moreover, the materials, sizes, processing procedures and the like in the above-mentioned Embodiments are of examples, and are capable of being carried into practice with various modifications thereof within the scope of exhibiting the effects of the invention. Further, the invention is capable of being carried into practice with modifications thereof as appropriate without departing from the scope of the invention.

The invention claimed is:

1. A magnetic recording medium comprising:
a nonmagnetic substrate;
a magnetic recording layer that is a perpendicular magnetic film in which an axis of easy magnetization is oriented substantially perpendicularly to a substrate surface of the nonmagnetic substrate; and
a recording auxiliary layer having magnetism that is directly formed on the magnetic recording layer,
wherein the recording auxiliary layer has magnetic portions having magnetism and nonmagnetic portions made nonmagnetic by including implanted ions, the magnetic portions exist in areas corresponding to track regions, and the nonmagnetic portions exist in areas corresponding to between track regions,
wherein a guard layer is formed between the magnetic recording layer and the recording auxiliary layer, serving to block migration of implanted ions into the recording layer,
wherein the guard layer has a thickness sufficiently thin that it precludes formation of crystals, and wherein the guard layer is made of a material having at least one of Ru, Pt or CoCrSiO2 as a main component.

2. The magnetic recording medium according to claim 1, wherein a film thickness of the recording auxiliary layer is thinner than a film thickness of the magnetic recording layer, whereby non-magnetic particles can be formed in a desired pattern.

3. The magnetic recording medium according to claim 1, wherein a protective layer is formed on the recording auxiliary layer, and a distance from the top surface of the protective layer to the top surface of the recording auxiliary layer is 7 nm or less.

4. The magnetic recording medium according to claim 1, wherein the magnetic portions in the recording auxiliary layer are perpendicular magnetic films where the axis of easy magnetization is oriented substantially perpendicularly to the nonmagnetic substrate.

* * * * *